INVENTORS
JOHN J. BYRNE &
ROBERT W. CRUGER

July 28, 1964 J. J. BYRNE ETAL 3,142,458
AIRCRAFT LAUNCHING AND ARRESTING DEVICE
Filed July 12, 1961 12 Sheets-Sheet 3

INVENTORS
JOHN J. BYRNE &
ROBERT W. CRUGER
BY Williams, Tilbowne & Dolick
ATTORNEYS

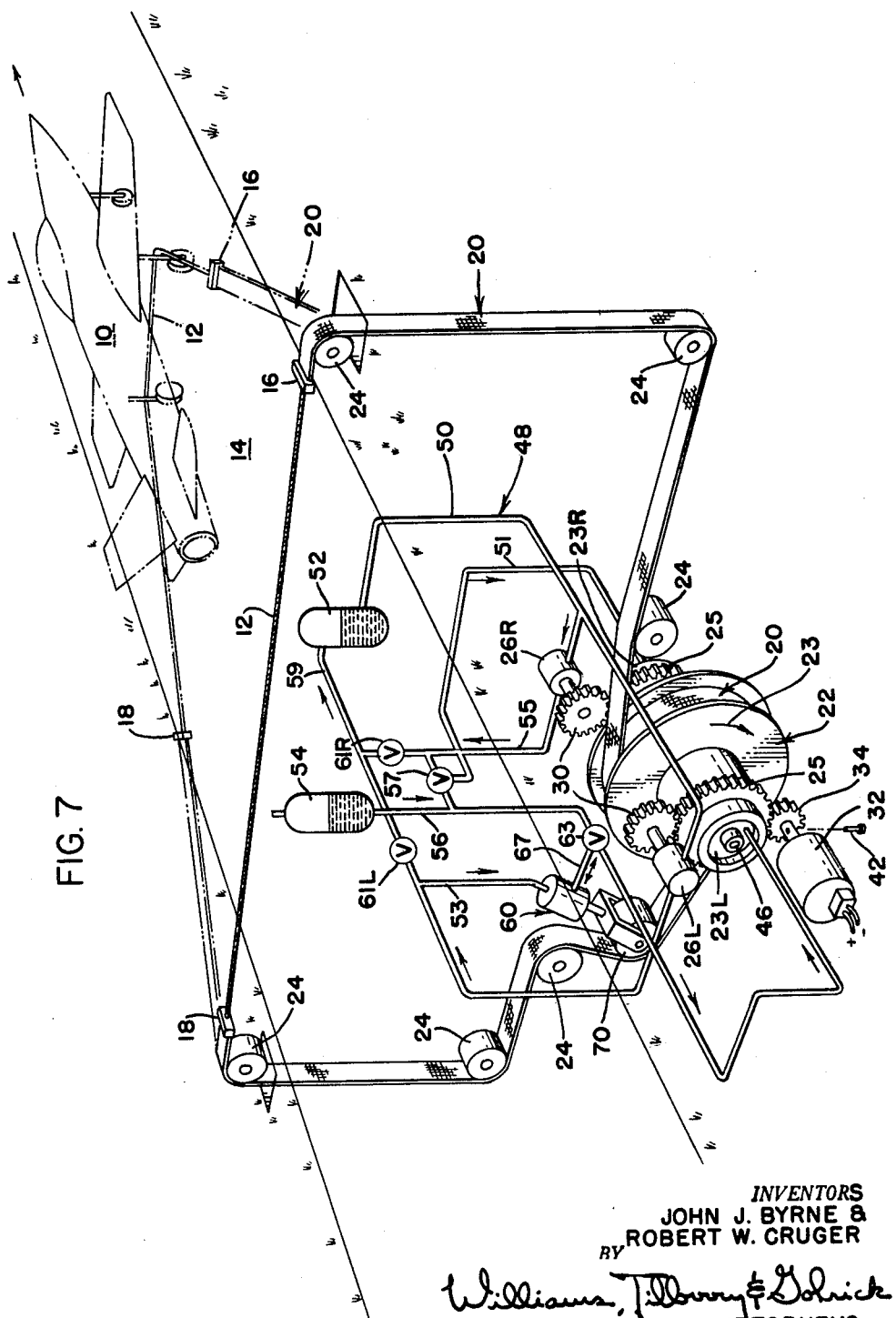

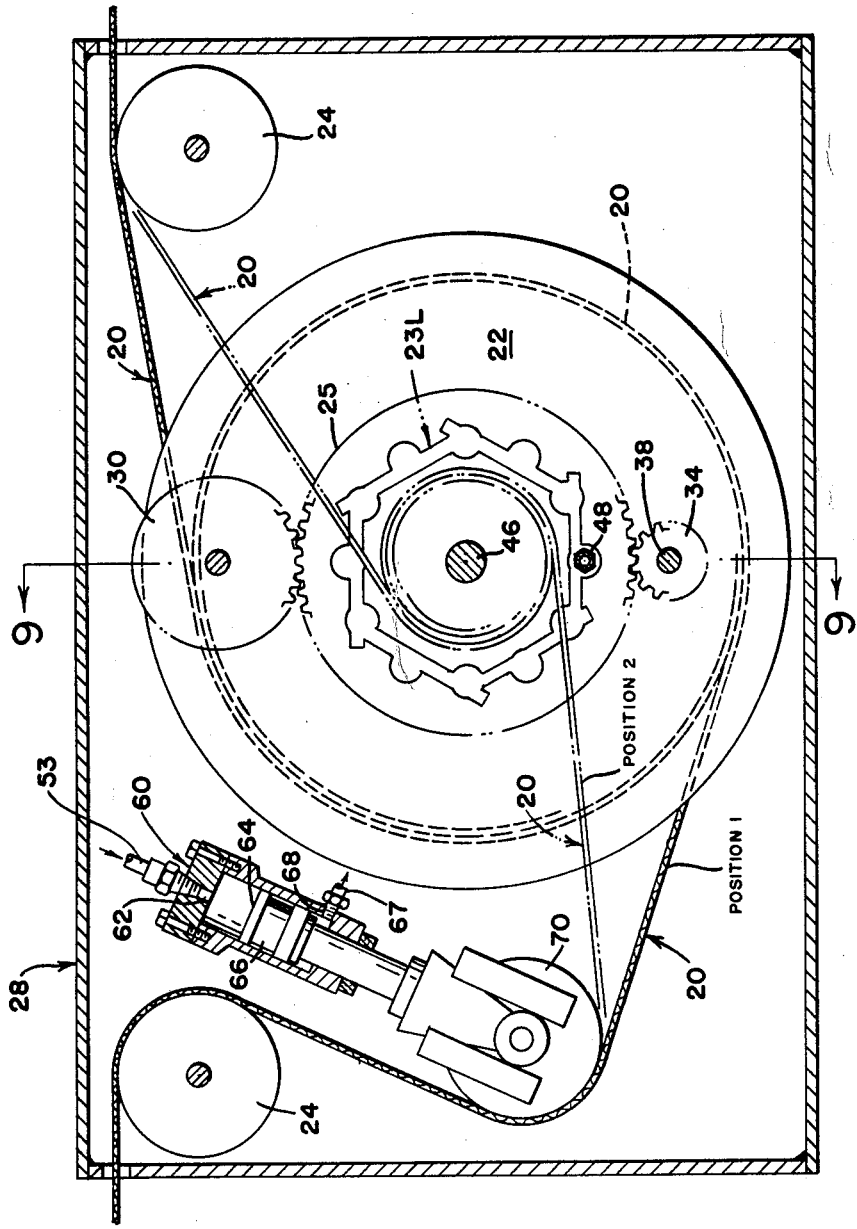

July 28, 1964     J. J. BYRNE ETAL     3,142,458
AIRCRAFT LAUNCHING AND ARRESTING DEVICE
Filed July 12, 1961     12 Sheets-Sheet 8
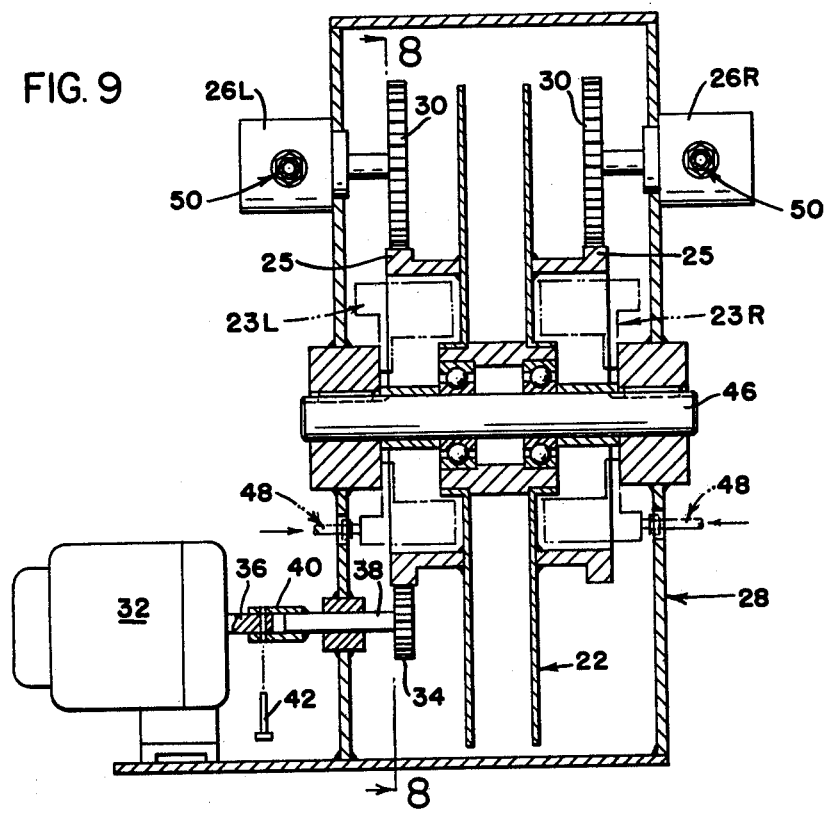
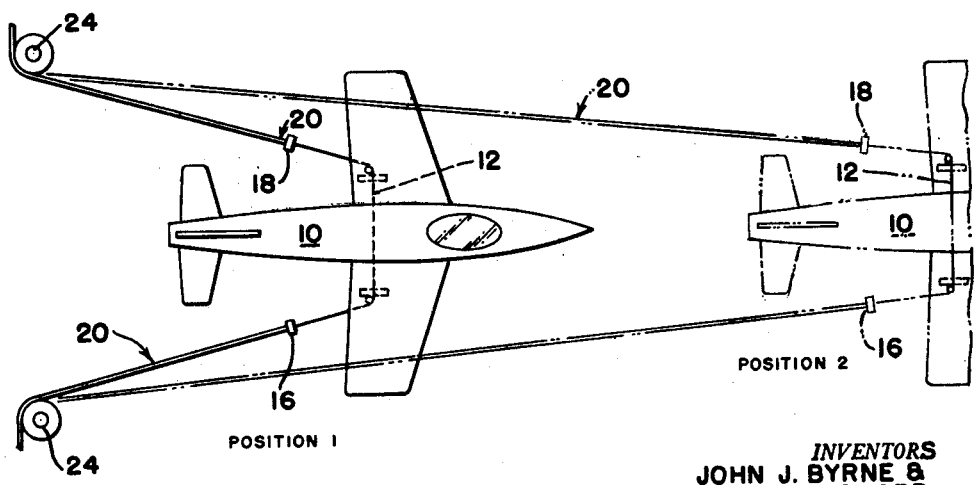
INVENTORS
JOHN J. BYRNE &
ROBERT W. CRUGER
BY
ATTORNEYS

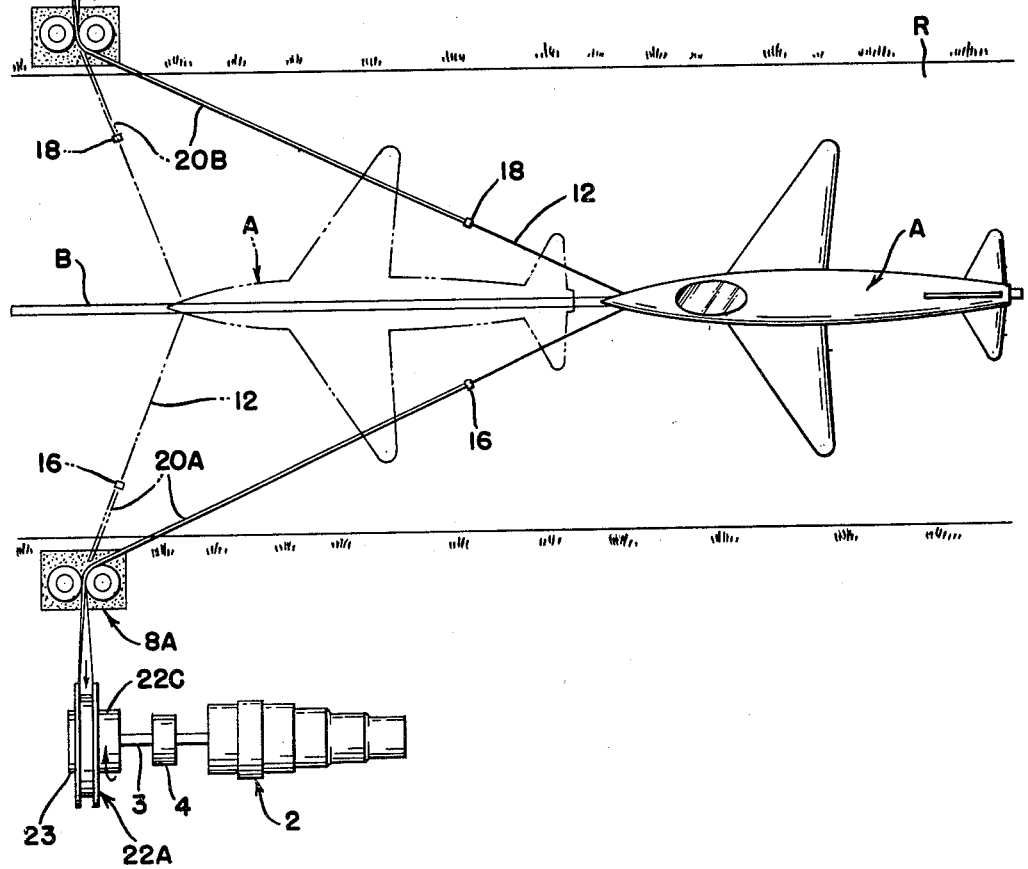

July 28, 1964  J. J. BYRNE ETAL  3,142,458
AIRCRAFT LAUNCHING AND ARRESTING DEVICE
Filed July 12, 1961  12 Sheets-Sheet 10

INVENTORS
JOHN J. BYRNE &
ROBERT W. CRUGER
BY
Williams, Tilbury & Dolick
ATTORNEYS

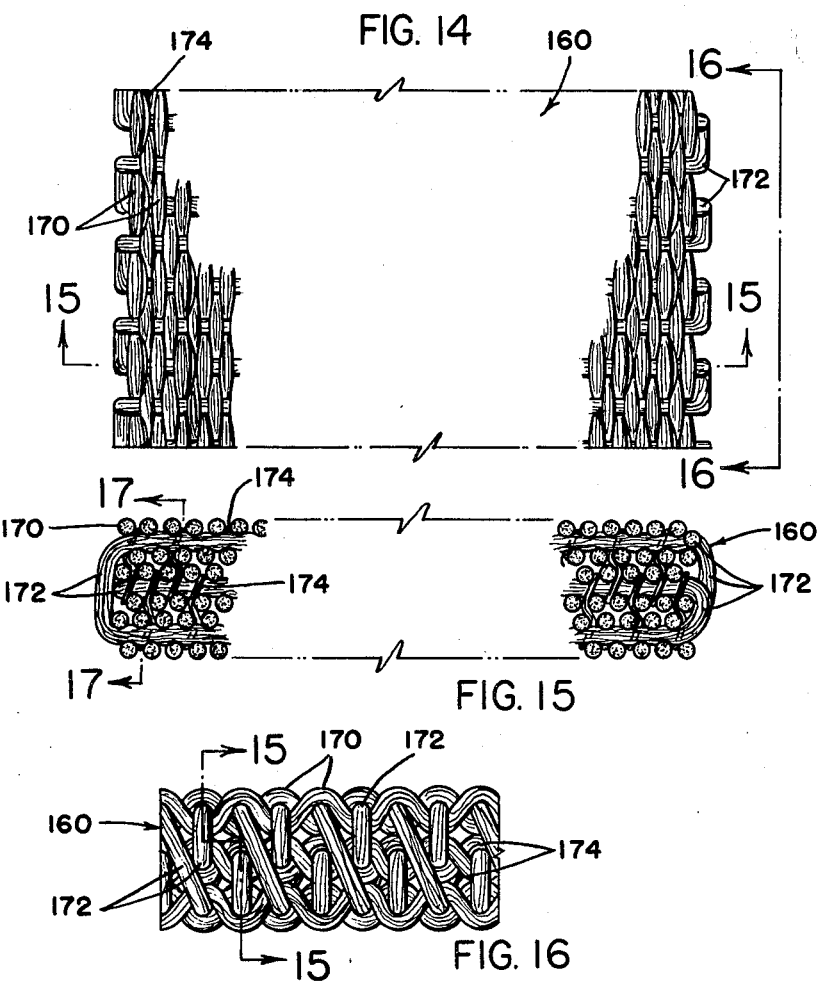

July 28, 1964     J. J. BYRNE ETAL     3,142,458
AIRCRAFT LAUNCHING AND ARRESTING DEVICE
Filed July 12, 1961     12 Sheets-Sheet 12
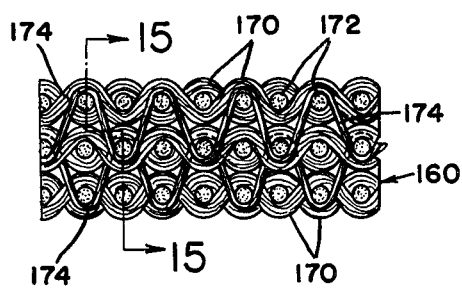
FIG. 17
FIG. 18
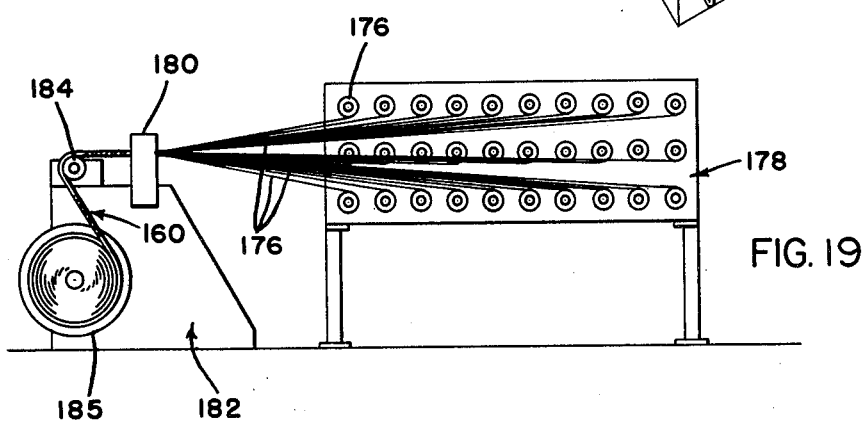
FIG. 19
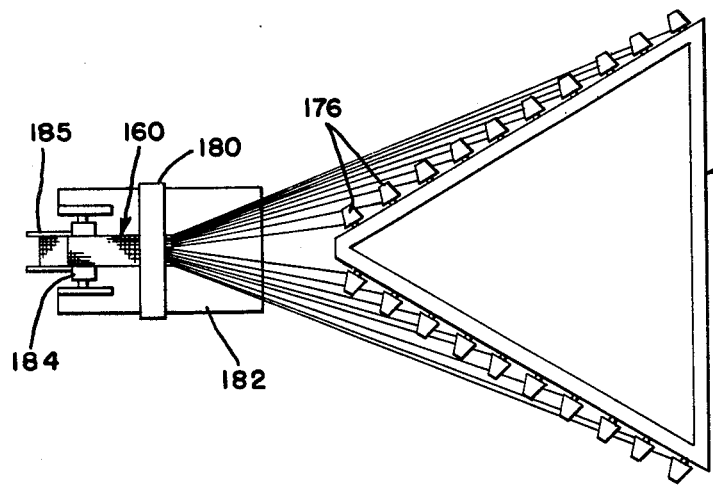
FIG. 20
INVENTORS
JOHN J. BYRNE &
ROBERT W. CRUGER
BY Williams, Bunny
& Golrick
ATTORNEYS

United States Patent Office 3,142,458
Patented July 28, 1964

3,142,458
AIRCRAFT LAUNCHING AND ARRESTING
DEVICE
John J. Byrne and Robert W. Cruger, both of Philadelphia, Pa., assignors to E. W. Bliss Company, Canton, Ohio, a corporation of Delaware
Filed July 12, 1961, Ser. No. 123,527
31 Claims. (Cl. 244—63)

This invention relates in general to aircraft launching and arresting means, and more particularly to mechanical and hydraulic rotary energy absorbing engines employed in association with aircraft launching and arresting means. This application is a continuation-in-part of our co-pending parent application, Serial No. 778,723, filed December 8, 1958, now abandoned. Patent application Serial No. 778,723 was co-pending with our patent application Serial No. 773,220, filed November 12, 1958, now Patent No. 2,977,076, issued March 28, 1961. All of the disclosure of application, Serial No. 773,220 was specifically incorporated by reference into application, Serial No. 778,723, and said disclosure is likewise incorporated by reference into this present continuation-in-part application.

The general scheme for arresting the forward speed of aircraft making a landing on an airstrip, the deck of an aircraft carrier, or the like, is to provide a pendant which is placed transversely across the path of the aircraft to be intercepted by an aircraft hook, or a portion of the aircraft itself. The opposite ends of the pendant are secured to payout means which will permit the pendant to yield with the aircraft and yet at the same time provide predetermined resistance to the aircraft's forward motion of a magnitude sufficient to bring the aircraft to a stop within a predetermined distance and in a safe and gradual manner. Although the general increase in aircraft size and landing speeds has made our invention necessary, its importance is particularly accentuated with the advent of jet aircraft which land at even higher speeds, and require even longer runways than heretofore.

In the process of arresting the forward movement of an aircraft, the energy of motion of the aircraft must be translated into another form, and it is the object of our invention to provide an energy absorbing means which operates in a novel and improved manner over presently existing devices for absorbing the energy of landing aircraft. It is another object of our invention to provide an energy arresting device which is compact, easily transported, installed and operated, and which is suitable for expeditionary type purposes, as well as commercial use. It is yet another object of our invention to provide an improved aircraft arresting device which provides resistance to aircraft movement proportional to the speed of the aircraft. It is still another object of our invention to provide a means to modulate the peak to mean load on the system whereby maximum energy is absorbed when short runway arrestment is necessary. A further object of our invention is the provision of a low inertia, high engaging speed, high energy absorber. A still further object of our invention is the provision of energy absorbing engines arranged in a novel tandem relationship for increased energy absorbing capacity. Yet a still further object of our invention is the provision of an energy absorbing system adapted to respond to off-center loading, and pendant engagement permitting a differential payout at opposite pendant ends.

Inasmuch as launching and arresting operations as they relate to our invention are substantially the reverse of each other, it is yet another object of our invention to provide a single mechanism which serves the dual purpose of both launching and arresting aircraft. Still another and important object of our invention resides in the provision of novel payout reel and tape means equally adaptable with the several embodiments of the invention contemplated, disclosed and discussed in this specification. Another object of our invention resides in the provision of novel reel and tape means equally advantageous in both arresting and launching functions of embodiments of the invention. Another object of our invention resides in the utilization of a tape of novel configuration adapted to permit superior coaction with its reel means in both launching and arresting operations. It is still another object of this invention to provide an aircraft arresting engine having programming means adapted to regulate and control force versus runout relationships. It is still yet another object of this invention to provide an aircraft launching and arresting system which can quickly be re-set for substantially continuous operation.

Other objects of our invention willl become apparent from a reading of the specification, taken in consideration with the drawings and appended claims.

FIGURE 7 is a schematic perspective view of another embodiment of a launching and arresting system employed in the invention;

FIGURE 8 is a side elevational view with parts in section of the launching and arresting engine taken on the line 8—8 of FIGURE 9;

FIGURE 9 is a sectional elevational view of the launching and arresting engine taken on the line 9—9 of FIGURE 8;

FIGURE 10 is a plan view of a runway showing an aircraft in two stages of arrestment corresponding to the two stages of reel payout shown in FIGURE 8;

FIGURE 11 is a plan view of a modified embodiment of the launching and arresting system shown in FIGURE 5;

FIGURE 14 is a plan view of a synthetic fiber tape employed in a preferred embodiment of the invention;

FIGURE 15 is a sectional view taken on the line 15—15 of FIGURE 14;

FIGURE 16 is a fragmentary side elevational view taken on the line 16—16 of FIGURE 14;

FIGURE 17 is a fragmentary sectional view taken on the line 17—17 of FIGURE 15;

FIGURE 18 is a schematic representation of the pattern of transverse strands employed in the tape of FIGURES 14 through 17;

FIGURE 19 is an elevational view of the means to weave the tape of FIGURE 14; and FIGURE 20 is a plan view of the apparatus shown in FIGURE 19.

Although the preferred embodiments of our invention may be used in both launching and arresting operations, indeed this being one of the features of utility of the invention, still the operation of the inventive equipment is somewhat different in launching as compared to arresting. Accordingly, both the aircraft arresting and launching features of preferred embodiments of the invention will be discussed in detail to provide complete understanding of our inventive concept.

Figure 1:
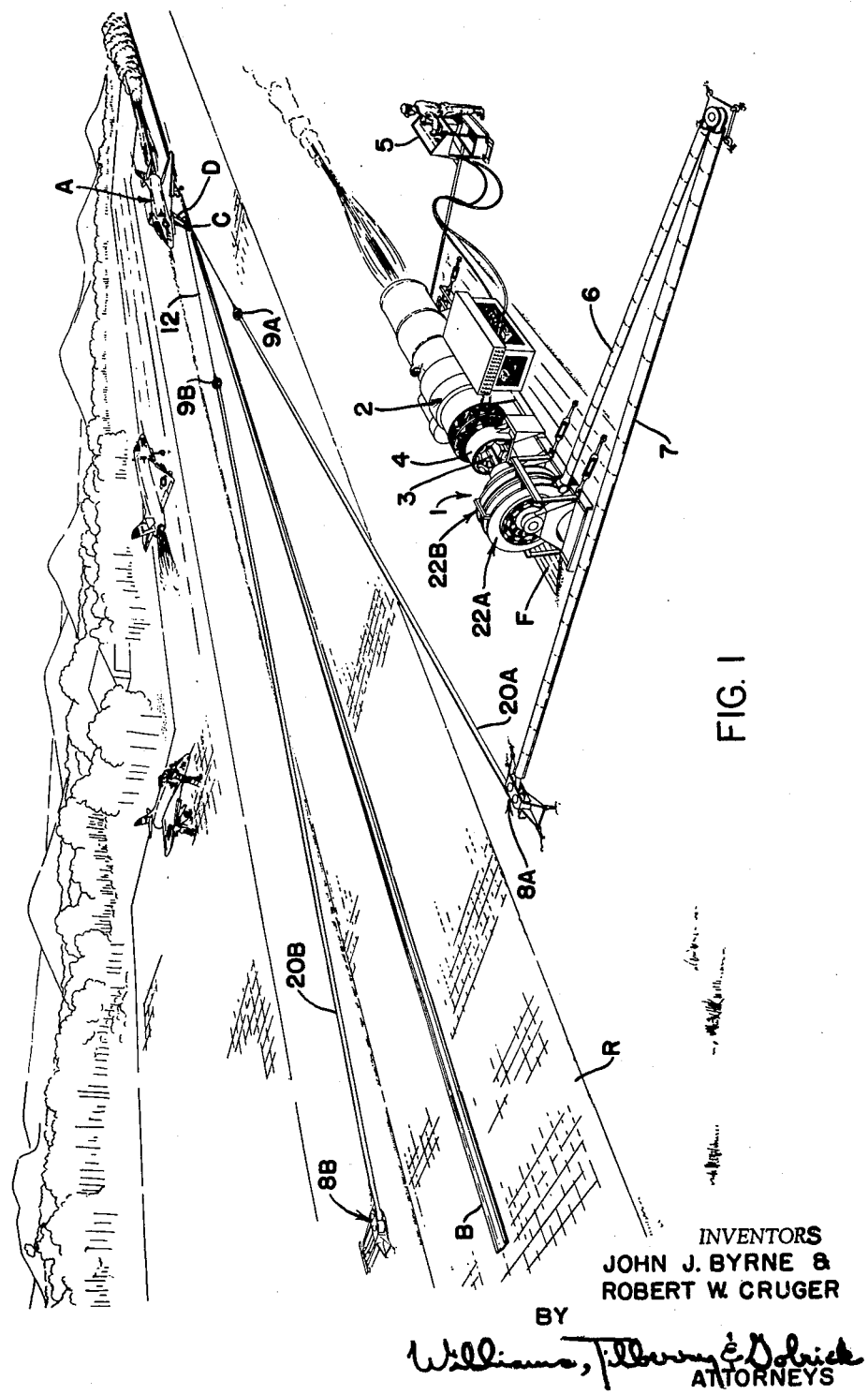
FIGURE 1 is a pictorial perspective view of the general organization of our invention shown in association with an aircraft in the process of being launched.

Referring now to the drawings in greater detail, and particularly to FIGURE 1, a typical installation is shown wherein our invention is employed to launch and arrest aircraft on runways normally too short to accommodate planes of a given type, weight, and speed. A runway R is provided with a runway flush center track B for guiding a launching chock C securable to an appropriate appendage D of the aircraft A. Positioned to one side of the runway is to be found one embodiment of our combination takeup, payoff and energy absorber reel 1, which in launching operations is driven by a jet turbine 2 connected to the combination takeup reel and energy absorber by means of shafting 3 and clutch 4. The installation is controlled by an operator positioned in front of a control panel 5 conveniently placed in a position of vantage for viewing the runway. The jet turbine 2 may be of considerably less capacity for arresting operations than for combination arresting and launching operations, all as will be developed hereinafter.

A flat nylon tape such as shown and described in our Patent No. 2,977,076, is secured to the combination take-up and payoff reel 1, it being also understood that when reference is made to this reel, it is either a takeup reel or a payoff reel without modification, depending on its function at the moment, whether it be launching, arresting, or rewinding. Accordingly, this reel will henceforth be referred to without any further designation as to its capacity.

The reel 1 is adapted to wind and unwind a pair of flat nylon tapes 20A and 20B. Nylon tape 20A partially encased in protective conduits 6 and 7, passes between a pair of sheaves 8A, and then extends down the runway to a fastening device 9A securing the tape to one end of a wire cable pendant 12. The other tape passes beneath the runway at F (in protective conduits not shown, but similar to conduits 6 and 7) and emerges between a pair of sheaves 8B to extend downward of the runway for connection by a fastening device 9B to the other end of steel pendant 12.

To launch an aircraft with the above described apparatus, the pilot of the aircraft A brings its engine up to speed at the same time that turbine 2 is brought up to speed, whereupon aircraft restraining means are released and takeup reel 1 is engaged to the turbine by clutch 4. The nylon tapes 20A and 20B are wound on respective reel spools 22A and 22B until the tapes are entirely rewound, at which time the pendant is substantially transverse of the runway between sheaves 8A and 8B, and the aircraft is airborne.

With the steel pendant 12 transverse of the runway R after launching, the system is then automatically in readiness to arrest an aircraft coming in for a landing. In the arresting operation, suitable pendant intercepting means, such as a hook, landing assemblage or the like (see FIGURE 2), secured to the aircraft A, engages the steel cable pendant 12. After a finite period of time, explained more fully in our Patent No. 2,977,076, the impact of the aircraft A on the pendant 12 causes the nylon tapes 20A and 20B to turn reel 1 and thereby pay out the tape at a substantially constant tension designed to bring the aircraft to a smooth, gentle stop within a predetermined distance.

After the aircraft has been arrested according to plan, the arresting pendant 12 and nylon tapes have been paid out and are extended from one thousand to several thousand feet down the runway. If it is necessary thereafter to recover this tape and rewind it on the reel preparatory to a subsequent arrestment, the jet turbine is then placed into operation to rewind the tape on the reel exactly in the same fashion in which it was wound when launching aircraft in the manner previously described. Thus, it will become apparent that in both the launching and arresting functions of the apparatus, the jet turbine winds and rewinds the reel in the same angular direction for the same purpose, to-wit: to coil the nylon tape on the reel. The ease and speed with which tape is recovered on the reel is an important feature of our invention. We have successfully operated our equipment wherein runouts of over one thousand feet are routinely rewound in less than five minutes without the necessity of personnel other than the sole operator, and without any auxiliary equipment. The only other aircraft arresting system actually reduced to practice, of which we are aware, requires a crew of about ten men, two tractors and about forty-five minutes to set up for a second arrestment.

There is no energy absorbing problem in launching operations inasmuch as all of the energy of the system is expended in getting an aircraft airborne. However, on the arrestment side of the operation, considerable energy must be dissipated in bringing an aircraft to a stop, and the means for accomplishing this will now be described.

Figure 2:
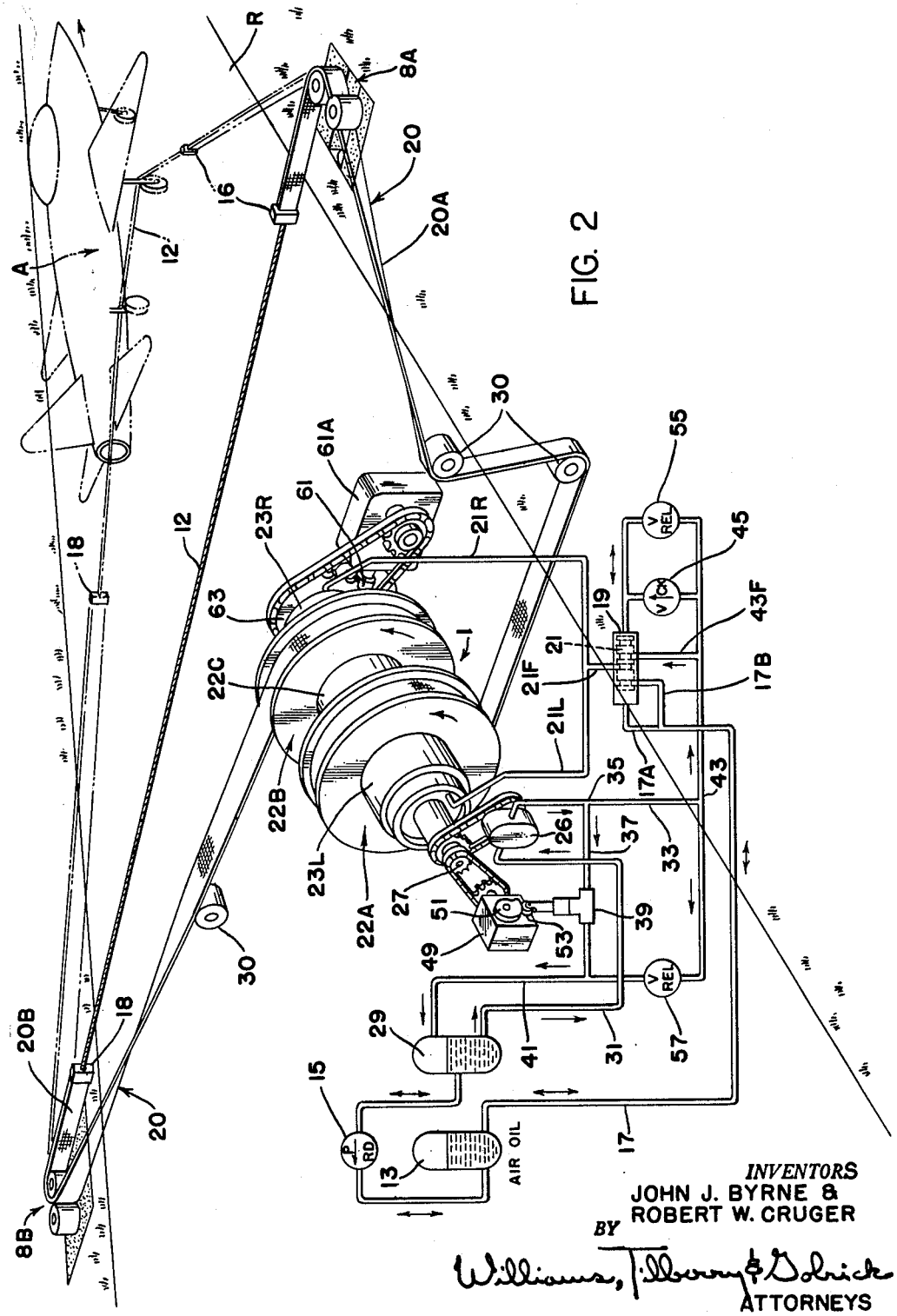
FIGURE 2 is a schematic perspective view of a preferred embodiment of a launching and arresting system employed in the invention.

Reference is made to the drawings in greater detail, and to FIGURE 2 in particular. An aircraft A is shown making engagement with a pendant 12 stretched transverse of the runway R, said aircraft being in the process of arrestment. The opposite ends 16 and 18 of the pendant 12 are secured to a pendant payout means 20, comprising a pair of tapes 20A and 20B which are spirally wound on separate spool portions 22A and 22B of reel 1 in such manner that when the reel revolves in the direction of the arrows, the tapes will pay out in opposite directions from the reel to permit the pendant 12 to move with the aircraft down the runway. Spools 22A and 22B are coupled with an over-running clutch 22C to permit differential angular velocity between the two spools. This is particularly important during off-center arrestments wherein the one spool is permitted as a consequence to rotate faster than the other. The result is therefore a self-compensating adjustment to the center of the runway.

Figure 3:
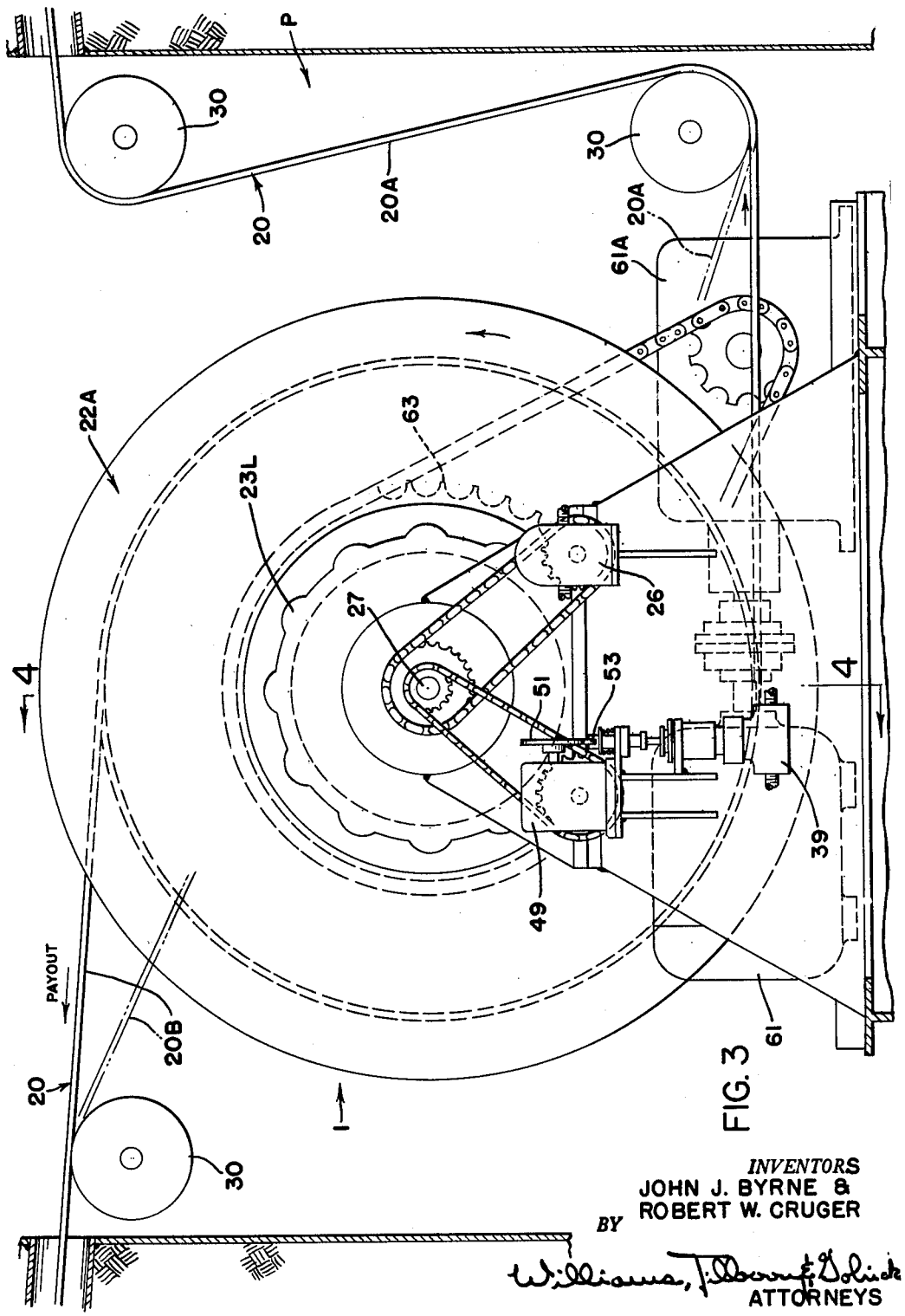
FIGURE 3 is a side elevational view of the launching and aresting engine shown in schematic perspective in FIGURE 2.
Figure 4:
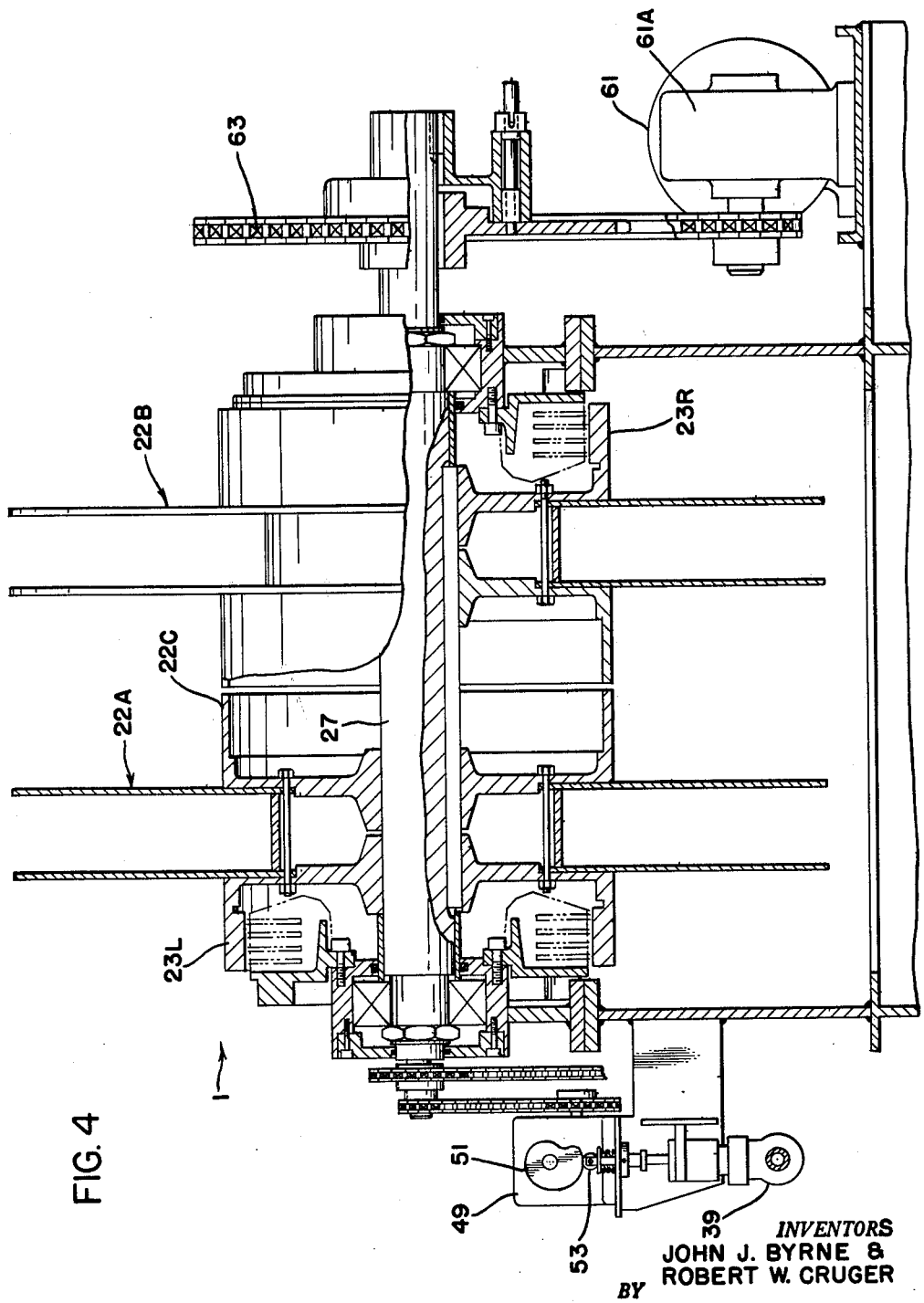
FIGURE 4 is a front elevational view of the launching and arresting engine shown in FIGURE 3.
Figure 5:
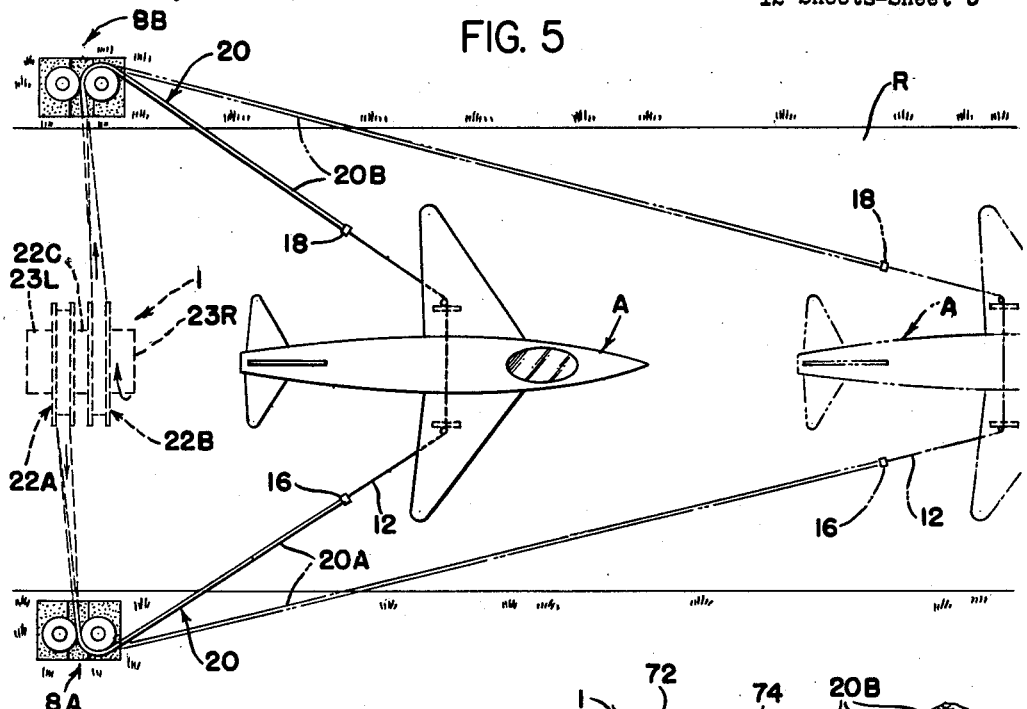
FIGURE 5 is a schematic plan view of the launching and arresting system shown in FIGURE 2.

It will be observed that suitable pairs of sheaves 8A, 8B, and 30 are secured strategically adjacent the runway to guide the payout movement of the tapes 20A and 20B. As suggested by FIGURES 2 and 3, this entire reel mechanism may be encased in a pit P beneath the runway, or in the embodiment of an expeditionary system, shown in FIGURE 1, the reel may be staked out on the surface adjacent to one side of the runway.

In yet another embodiment of expeditionary gear, the spool portions 22A and 22B may be split and located on opposite sides of the runway R, as shown in FIGURE 11, thereby avoiding the necessity of tunneling beneath the runway in order to locate tape 20B such as in FIGURE 1. In the embodiment of FIGURE 11 each spool component is a complete reel unit in itself, having both a windup drive motor 2, and a braking system 23. For purposes of understanding the invention, a complete discussion of the embodiment shown in FIGURE 2 will be undertaken, which will also explain the operation of the embodiment shown in FIGURE 11.

Attention is now directed to the hydraulic system of the reel shown schematically in FIGURE 2. A static air-oil reservoir 13 is maintainable under pressure by means of air pump means 15. Oil is directed through line 17 to shuttle valve 19. Pressure in branch 17A shifts piston 21 to the right thereby connecting branch line 17B to brake actuator feeder line 21F and brake actuator lines 21L and 21R. In a preferred embodiment, United States Air Force B52 bomber brakes (otherwise identified as Bendix brake assembly No. 150556) are used for braking. Thus static brake pressure tank 13 maintains pressure on brakes 23L and 23R, which in turn maintains pendant 12 in tension transverse of the runway R, and in readiness for interception by landing aircraft A.

When the pendant is contacted by the aircraft A and shifted to the position shown in FIGURE 2 in phantom, the pendant payout means 20A and 20B rotate the reel 1, which in turn drives hydraulic pump 26, which is chain driven from reel shaft 27. As pump 26 is operated, hydraulic fluid is drawn from pump fluid reservoir 29 through line 31 on the low pressure sides of the pump, through pump 26, and then outwardly on the high pressure side of the pump through line 33. Line 37 is tapped from line 33 at junction 35, and is connected to a normally open valve which controls the return of fluid through line 41 to the brake fluid tank 29. The fluid also is carried in line 43 through check valve 45 to the right side of spool valve 19. As the fluid pressure builds in the system corresponding to the increased velocity of the reel, the static pressure side of the valve 19 applied by line 17A is overcome and the spool piston 21 is shifted to connect feeder lines 43F and 21F to lines 21L and 21R, whereupon the pressure from the pump 26 replaces the static pressure from static brake pressure tank 13.

It will be apparent therefore that the faster the reel rotates, the greater will be the pressure developed in brakes 23L and 23R acting to resist rotation. Thus, when the plane is at its greatest velocity after contacting the pendant 12, the resistance to forward movement is the greatest. As the plane is gradually decelerated, the reel, of course, will decelerate, pump 26 will decelerate, and the pressure in brakes 23L and 23R normally would also tend to decrease. To provide for better control over aircraft deceleration, or to provide adjustment for aircraft of different sizes, a programming device, now to be described, may be included in the system to assure a more constant or predetermined pressure throughout the period of arrestment.

Programming means comprising a gear box 49 chain driven from reel shaft 27 to rotate a cam 51 which in turn operates a cam follower 53 to program the opening and closing of valve 39, and thereby control the pressure in the hydraulic system. One cycle of rotation of the cam 51 is designed to provide continuous adjustment in the pressure system during the entire runout capacity of the reel. Thus, valve 39 normally open at the beginning of the arrestment is gradually closed at a predetermined rate in order to maintain a given pressure, or a controlled rate of decline of pressure in the system.

In order to recover the system for a second arrestment a normally closed manual shutoff valve 55 is opened to relieve the pressure on the operating pressure side of the spool valve 19 and thereby permit the pressure from the static brake pressure tank 13 to again shift the piston 21 to re-establish static pressure on the reel brakes. It will be noted that line 43 is also provided with a relief valve 57 which coacts with valve 55 to relieve pressure on the operating side of the valve 21. The heat generated in brakes 23L and 23R may be dissipated with suitable water jackets surrounding the brakes. So encased, the brakes can function effectively even though arrestments are made consecutively in rapid order. Our system has been tested successfully wherein arrestments have been continuously made as rapid as the tapes 20 and pendant 12 could be repositioned. To this end, a rewind motor 61 drives gear box 61A which is chain driven to a sprocket 63 secured to the end of reel shaft 27 opposite from that of the pump and cam driven belt connections. For expeditionary purposes a motor generator set, or a gasoline or diesel engine may be adapted as a source of power for rewinding the reel after an arrestment has been made. Of course it will be recognized that the power requirements of the motor must be considerably greater if the system is to be used for both launching and arrestment. For dual application a jet turbine 2 such as shown in FIGURE 1 could be substituted for motor 61.

Reference is now made to FIGURE 7, wherein is shown a preferred embodiment of the invention utilized for arrestments of shorter distance than contemplated for the embodiment of FIGURE 2. Because of the relatively short runout, it is observed that only a single reel 22 may be employed. An aircraft 10 is shown in FIGURE 7 making engagement with a pendant 12 stretched across runway 14, and said aircraft is in the process of being brought to a stop. The opposite ends 16 and 18 of the pendant 12 are secured to a pendant payout means 20, preferably nylon tape, as aforesaid. The tape 20 is spirally wound upon a reel 22 so that when the reel revolves in the direction of the arrow 23, the tape will pay out in opposite directions from the reel to permit the pendant 12 to move with the aircraft down the runway. Suitable sheaves 24 are provided where needed to guide the movement of the payout tape 20.

As is shown more clearly in FIGURES 8 and 9, the reel 22 is provided with a pair of gears 25 positioned on opposite sides of the reel. A pair of hydraulic pumps 26L and 26R are mounted on the reel housing 28 (see FIGURE 9) and are drivingly connected to pinion gears 30 in meshed engagement with gears 25. A reel drive motor 32 is also provided and is drivingly connected to gear 25 by means of pinion gear 34 in meshed engagement with ring gear 24. As in the case of the embodiment of FIGURE 2, the horsepower rating of the rewind motor 32 will depend on whether this embodiment of the invention is to be used for the dual function of both launching and arresting, or for arrestment alone. The drive shaft 36 of the motor 32 is coupled with the shaft 38 of pinion gear 34 by means of a sliding coupling 40 which is locked to motor drive shaft 36 by pin means 42. Hydraulic brake means 23L and 23R are provided on opposite sides of reel 22 and journaled on reel shaft 46 with respect to the portion rotating with reel 22. The stationary portion of the brake means is secured to reel frame 28 wherein are provided hydraulic connecting means 48 adapted to actuate the brakes.

Referring back to FIGURE 7, pumps 26L and 26R are connected to develop pressure in a hydraulic system, generally designated at 48. A static pressure fluid reservoir 54 is connected by a standpipe 56 to both hydraulic brake assemblies 23L and 23R in order to maintain a constant minimum static pressure on the brake assembly and thus a slight amount of tension on the pendant 12, and payout means 20. As indicated by the arrows associated with the hydraulic system 48, in addition to re-circulation of hydraulic fluid by pump 26R to and from reservoir 52 through lines 50, 55 and 59, fluid is also pressurized in line 51 connected to brake assembly 23R. In like manner, pump 26L, in addition to recirculating hydraulic brake fluid to and from reservoir 52, through lines 50 and 59, also pressurizes line 53 to sensing cylinder 60, which is interposed between the reservoir 52 and brake assembly 23L.

A normally open shuttle valve 57 is placed at one end of line 51 between lines 55 and 56 to permit static pressure between reservoir 54 to be applied to the right brake 23R through line 51 while at the same time restricting line 55 on the high pressure side of the right pump 26R. When the right pump 26R is actuated by rotation of the reel 22, the pressure from the pump overcomes the static pressure acting on the piston of shuttle valve 57, and shifts this piston to allow pump pressure to be applied to the brake through line 51. With pump 26R thus in operation, pressure from static reservoir 54 is cut off to brake 23R, and fluid is slowly metered by metering valve 61R to reservoir 52 at such a rate as to maintain a predetermined pressure within the system.

In like manner, a normally open shuttle valve 63 is interposed between line 67 and line 56 to permit static pressure from reservoir 54 to reach the left brake 23L while blocking line 67. When the left pump 26L is actuated, pressure from the pump through line 53 acting on the sensing cylinder piston 66 relays pressure through line 67 to shuttle valve 63 whose piston then shifts to block line 56 to reservoir 54, and allows sensing cylinder pressure to react on the brake 23L through line 56. A metering valve 61L is disposed in line 59 between lines 53 and 55 to provide and maintain any desired operating pressure on this side of the system.

For a better understanding of the function and construction of the sensing cylinder 60, reference is now made again to FIGURE 8. It will be recognized that when a friction type disk assembly, such as employed with this embodiment of the invention, becomes heated due to coaction of one disk against the other, the coefficient of friction of the brake will correspondingly change, likewise static and high running speed coefficients of friction are not the same. Nevertheless, a uniform retarding load is desirable throughout the engagement of the aircraft, and the sensing cylinder, as will be described more fully hereinbelow, acts to proportionately decrease the brake pressure as the coefficient of friction of the brake disks increases and vice versa.

Hydraulic brake fluid is received from pump 26L at port 62 to exert pressure against the end 64 of piston 66. This pressure is transmitted by piston 66 to port 68 which in turn is connected to line 67, the pressure therein actuating brake 23L. The piston 66 is provided with a follower sheave 70 adapted to make engagement with payout tape 20 and to "sense" the tension in the payout tape. Thus, as the reel rotates, thereby causing the pump 26L to apply pressure to brake 23L, the tension in tape 20 increases. The tape tension is sensed by sensing cylinder 60 in that a thrust is applied against follower sheave 70 to force the piston 66 inwardly. As piston 66 is moved inwardly, pressure in line 67 is relieved to a degree wherein the tape tension is then proportional to the pump pressure. If the coefficient of friction in brakes 23L and 23R is higher than normal, the tension in the tape, and the consequent force vector acting on the sensing cylinder follower sheave 70, is increased forcing the piston 66 inwardly to reduce the brake line 67 pressure, thereby decreasing the amount of braking, and relieving the tension in the tape 20. If the coefficient of friction in brakes 23L and 23R is lower than normal, the tension in the tape and force on the sensing cylinder follower sheave is decreased, and piston 66 moves outwardly to increase the pressure in line 67 acting on the brake 23L.

This is a very sensitive mechanism and is responsive to slight changes in coefficient of friction with the net effect of modulating or averaging such changes to provide a smooth constant decelerating influence on the landing aircraft. The payout tape 20 is shown in two positions on the reel 22 to illustrate that the angle of wrap about the sensing follower sheave 70 is less at the start of the payout as shown by the aircraft 10 in FIGURE 10, position 1, than is the angle of wrap toward the end of the payout when the aircraft is at Position 2. It will be recognized that the resultant component of force acting against the piston 66 increases as the angle of wrap of tape 20 increases.

Figure 6:
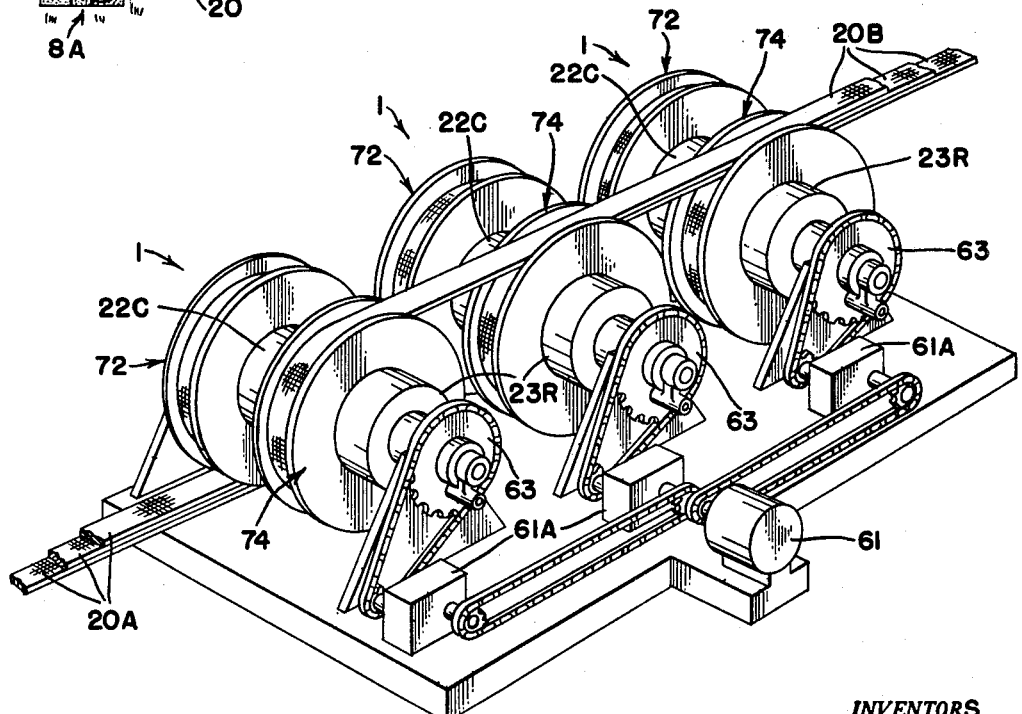
FIGURE 6 is a perspective view of a tandem arrangement of a launching and arresting engine embodiment employed for heavy duty arresting operations.

When longer runways are available and/or heavier aircraft landing at higher speeds must be arrested, the embodiment of our invention shown in FIGURE 6 is applicable. Herein we have shown a series of arresting engines with dual tape reels to increase the energy absorbing capacity of the system and yet maintain a relatively small size unit. The reels shown in tandem are provided with pairs of spools 72 and 74. The spools identified by the numeral 72 are adapted to permit a payout of tapes 20A to the left as shown in FIGURE 6, and the spools identified by their numeral 74 are adapted to provide a payout of tapes 20B to the right. This arrangement then retains the features of low inertia which permit high engaging speeds such as are inherent in the single reel embodiment of the invention already described. The tandem arrangement provides for greatly increased energy absorbing capacity. Each spool is connected to its mating spool by means of an over-running clutch 22C arrangement of any conventional design well understood in the art, whereby if an unexpected or excessive demand is placed on one side of the system as compared to the demand on the opposite side, such as developed by off-center engagement, the high demand side of this system will be permitted to slip or yield in order to provide the extra payout which this side of the system is demanding. This clutch construction is substantially identical to that employed with the embodiment of the invention shown in FIGURE 2, and of course may be installed similar to the arrangement shown in FIGURE 11, wherein tandem spools 72 may be located on one side of the runway and tandem spools 74 may be located on the opposite side in lieu of the single spools shown in FIGURE 11.

Figure 12:
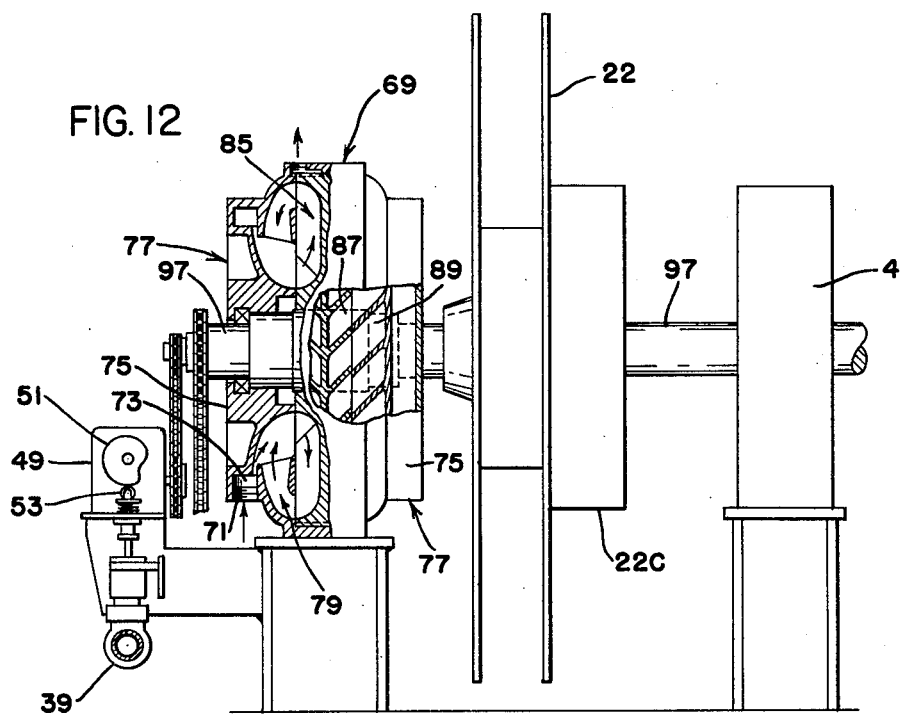
FIGURE 12 is an elevational view with parts in section showing the use of a water brake in another preferred embodiment of the invention.
Figure 13:
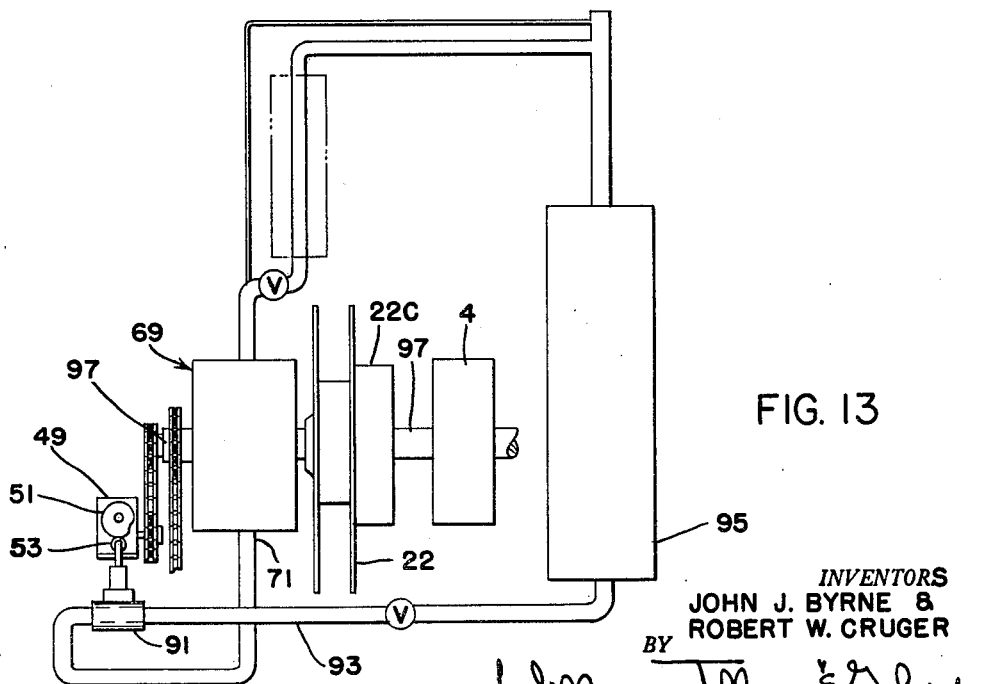
FIGURE 13 is a schematic view of a hydraulic feed and control system used in conjunction with the water brake shown in FIGURE 12.

Reference is now made to FIGURES 12 and 13 wherein is illustrated yet a third embodiment of our invention in which we employ the principles of a water brake for the same purposes as set forth and described heretofore with respect to the embodiments of FIGURES 2 and 7.

Generally stated, a water brake within the concept of our invention, is a hydro-dynamic device that absorbs power by converting mechanical energy into heat in its working liquid medium, this liquid medium normally being water. Resistance is created exclusively by fluid friction and agitation of the water circulated between vaned pockets of the rotor and stator elements, with the conversion of mechanical energy into heat taking place directly within the water itself. The amount of mechanical energy that can be absorbed in this manner is dependent upon the quantity and velocity of the water in the working chamber.

Reference is now made more specifically to FIGURE 12 wherein a typical water brake 69 is shown partially in section. Water from inlet 71 passes directly into supply chambers 73 in each of housing 75 of the stator 77. From the stator supply chamber 73, water enters into each side of the working chamber 79.

The revolving speed of the water brake 69 under any load condition is controlled by the quantity of water in its working chamber 79. As the load varies, a constant revolving speed may be maintained by varying the static head 95 in the circulating system (see FIGURE 13) and stator supply chambers 73, or the volume of water entering the brake inlet which governs the quantity of water in the working chamber. When the rotor 85 is revolved in the direction to create resistance, the water in the rotor vaned pockets 87 moves to the outer ends of the pockets by centrifugal force where it is forced across into the vaned pockets 89 of the stator 77. As the vaned pockets 89 of the stator 77 are filled, the water in them is forced back across into the rotor vaned pockets 87 at the innermost point; and this cycle is repeated as long as the brake is revolved in a direction to create resistance. The fluid friction and agitation that thereby results develops a resistance against the revolving rotor 85 that converts the mechanical energy into heat in the water.

It will be readily seen that with any specific quantity of water in the working chamber, the velocity of the water circulated back and forth between the vaned pockets 87 and 89 of the rotor 85 and stator 77 respectively will be increased with the increased angular velocity of the rotor 85 with resultant increased fluid friction and agitation. In this manner, the horsepower capacity of the water brake increases approximately in proportion to the cube of its speed. If the speed is doubled, the horsepower resistance is increased eight times. Thus, the revolving speed limitation of the rotor is mechanical, but the horsepower capacity of the brake increases with speed in the above ratio to the maximum possible operating speed based on the physical capacity of the brake structure.

For our purposes, however, it is enough to analogize the similarity between the water brake embodiment of our invention, and embodiments of our invention wherein a fluid medium is acted upon in direct proportion to the angular velocity of the reel to apply braking effort against reel rotation. Thus, in the first two embodiments of our invention already discussed, rotation of the reel drives a hydraulic pump which in turn pressurizes a hydraulic system designed to apply hydraulic force against a mechanical brake. In the water brake embodiment of our invention, the rotor 85 is the hydraulic pump, and the stator 77 is the brake, such that the faster the reel is rotated, the greater will be the coaction between the pump 85 and the brake 77 to resist reel rotation. Therefore, it follows that in all embodiments of our invention, a hydraulic pump is an element of the combination, which acts against a brake, whether it be fluid or mechanical, in proportion to the velocity of the reel, the rotation of which provides energy for the hydraulic pump.

Reference is now made to FIGURE 13, wherein is shown a schematic representation of a typical circulating and control system for the water brake embodiment 69 of our invention. A valve 91 is provided in the supply line 93 leading from a static head 95 to the water brake 69. Valve 91 is adapted to control the rate at which water which can enter the water brake. This control is obtained in a manner quite similar to the programming means described relative to the brake system shown in FIGURE 2. For instance, a gear box 49 is chain-driven to reel shaft 97 and is selected to rotate cam plate 51 one revolution per cycle of arrestment. Thus cam follower 53 is secured to gate or throttle means in valve 91 for controlling the flow of water therethrough. The valve capacity is adjusted proportional to the need for maintaining a given tension on the aircraft. When the reel is rotating at a high angular velocity proportionately less water is required for coaction between the hydraulic pump rotor 85 and the hydraulic brake stator 77. However, as the angular velocity of the reel decelerates, or higher tension is required, valve 91 is proportionately opened to permit an increased rate of flow of water into the water brake 69 sufficient to maintain the desired tension on the tapes 20A and 20B.

Although programming means are not essential to successful aircraft arrestment by any of the embodiments of our invention, it is a useful control feature. In addition to providing tension control during arrestment, it is also very useful in adjusting the system for runouts of different lengths, as well as for providing means for adjusting for arrestment of different weight aircraft, wherein the runout may be the same, but the programmed tension requirements may differ. It follows therefore that various combinations of runout and tension control adjustments are possible with our programming means.

We consider of particular significance and importance to the successful operation of all embodiments of our invention discussed and disclosed herein the coaction and configuration of the reel and tape. Heretofore they have been touched upon generally, but specifically the advantages of our design will now be discussed in greater detail. We consider it to be particularly important that the tape be of a flat, wide band configuration wherein the width is great compared to the thickness of the tape sufficient to permit the tape to spirally wind and unwind upon itself concentrically layer upon layer. This is a distinct departure, to the best of our knowledge, from all prior art reeling mechanisms, wherein the material being wound on a reel is not amenable to coil building upon itself. For instance, with wound material such as wire cable, it is necessary to traverse the cable back and forth along the axis of rotation of the reel in order to build layers which are sufficiently stable to provide reliability in winding and unwinding operations. This method of reel winding is practically universal in application and, prior to our invention, was the only method for winding a payout element on a reel.

Now, however, by resorting to our novel configuration of tape, several advantages become apparent upon consideration. In the first place, it is possible with our tape configuration to impart sufficient strength to the synthetic fiber to enable the withstanding of the high forces of tension to which the fibers must be subjected. Additionally, the configuration of the tape lends itself to ease of handling and reliability in winding and unwinding, such that there is practically no possibility of fouling of the tape on the reel. This becomes readily apparent in view of the fact that there is no wedging action between adjacent turns of the tape such as is inherent in wire cable wound payout reels. Additionally, kinking, overlapping, binding and most other disadvantages of cable wound reeling are eliminated by our tape configuration.

Another and important benefit resides in using flat wide tape which can be coiled radially by laminating one layer of tape concentrically upon another. This benefit is found in a moment arm mechanical advantage which operates to increase the efficiency of the system, regardless of whether the apparatus is employed in launching or arresting operations.

Reference is now made to FIGURES 14 through 17 which illustrate the weave of the tape which we have adopted for use in our invention. It will be observed that the tape 160 comprises a plurality of longitudinally aligned load bearing strands 170, transversely bound together by a strand 172 passing from side to side. In addition to the longitudinal strands 170 and the transverse strands 172, smaller longitudinal strands 174 adjacent to longitudinal strands 170 extend longitudinally (FIGURE 14) and from top to bottom of the tape (FIGURES 15 and 17) to lock the top surface of the tape to the bottom surface. Thus, longitudinal strands 170 function as load bearing members in the tape, transverse strands 172 function to hold the tape conformity from side to side, and longitudinal strands 174 function to maintain conformity in the tape from top to bottom.

FIGURE 18 schematically illustrates the path of weave of the transverse tape 172 as it passes from side to side. FIGURES 19 and 20 illustrate the manner in which the tape is woven. It will be seen herein that a plurality of spools of monofilament yarns 176 are mounted on a creel 178 and each strand from each spool is fed into a bobbin assembly 180 mounted on the warper 182. The finished tape 160 passes over an idler roll 184 and is wound on reel 185. The technique of weaving the tape, not being the subject of this invention, will not be discussed in any additional detail inasmuch as these methods are well known to those skilled in the textile arts.

We employ drawn nylon for our tape, but recognize that other synthetic fibers can also be used such as rayon, for instance, and we further recognize that with the rapidly advancing technology of synthetic fibers still other fibers will eventually be developed which may prove to be of even greater utility than nylon. However, a high tensile strength synthetic fiber is required because of its resistance to moisture, rot, mildew, and adverse effects of weather, and because of the superior strengths obtainable in synthetic fibers over those of natural fibers.

Consider first an arresting operation. The tape is fully wound on a reel spool such that the moment arm from the outer layer of the tape to the axis of the rotation of the reel is at its greatest at the instant that the pendant is engaged by the aircraft. The result is that the coaction between tape and reel is at its maximum mechanical advantage in order to set the system in motion with the least force. Additionally this concept of flat tape, wide in relation to its thickness so as to be capable of being spirally wound on a reel in a single stack of concentric layers, is inherently capable of being designed to provide a smooth non-pulsating payout. Tape thickness, reel and spool diameter, and torque requirements are of course variables which can and must be determined on an individual basis by engineers skilled in the art to meet demands expected to be imposed on a particular installation. To our knowledge, no other arresting or launching system, prior to our concept, has this inherent capability. Thus in a correctly designed system, constructed in accordance with our teaching, as the tape pays out the moment arm progressively decreases such that the torque applied to the system by the momentum of the aircraft is proportionately reducing at the same rate as the aircraft deceleration. However, because the effective diameter of the reel decreases as the tape is payed out, the reel angular velocity tends to remain substantially constant. Since brake resistance is proportional to reel velocity, the tape tension acting on the aircraft is maintained relatively constant. The combination of reel and tape, therefore can be analogized to a velocity sensitive gear reduction system, or continuously variable transmission, to provide aircraft retarding force responsive to changes in aircraft velocity.

Considering now a launching operation, the tape is initially paid out to its full length wherein the minimum moment arm of the reel is substantially equal to one-half the radius of the reel drum. However, in this situation, the forces are reversed and it is the reel which must pull the aircraft rather than the aircraft which is pulling the reel as in arrestment operation. Thus, it is highly important that initially the moment arm of the reel be small in order to obtain the greatest possible turning effort in assisting aircraft to overcome its inertia of rest. However, once the aircraft is in motion and is being brought up to speed, the torque requirements on the reel become progressively reduced at the same time that reel speed must progressively increase. This is automatically provided by our tape which is winding upon itself and developing a moment arm of ever-increasing radius such that when the least torque and highest speed is required of the reel the torque has been reduced to its lowest level approximately at the time the aircraft becomes airborne. Thus, of all of the novel features and advantages of our developments, we consider the coaction of our novel tape and reel to be of primary importance to the successful operation of our invention.

It is to be understood that whereas several embodiments of our invention have been described hereinabove, these embodiments are by way of example only and are not to be construed in a limiting sense. It is recognized that other arrangements and modifications will readily occur to those skilled in the art upon reading the specification and the attached claims taken in conjunction with the included drawings. These other arrangements and modifications if based upon the teaching of our invention are intended to be covered within the spirit and scope of the appended claims.

We claim:

1. In aircraft arresting gear of the class described including a runway pendant adapted to be engaged by an aircraft while in motion, the improvement in rotary friction overrun gear comprising: pendant payout reel means; pendant payout means connected to opposite sides of said pendant and to said reel means; fluid operable brake means adapted to retard rotation of said reel means; fluid pump means operable by rotation of said reel means; and fluid means responsive to the operation of said pump means to engage said brake means with said reel means, whereby the back tension on said pendant provided by said reel means is a function of the velocity of said reel means.

2. The device set forth in claim 1 wherein said pendant payout means comprises drawn nylon tape woven from longitudinal and transverse strands, said longitudinal strands being conterminous between said pendant and said reel means.

3. The device set forth in claim 1, wherein said reel means comprises: a pair of spools, each spool being adapted to receive pendant payout means from one side of said pendant; and clutch means adapted to couple said spools one to the other, whereby off-center engagement of said pendant will enable one spool to payout at a rate greater than the other spool.

4. The device set forth in claim 1, wherein said reel means comprises: a plurality of pairs of spools, said pairs of spools being arranged in tandem and each spool of each pair of spools being adapted to receive pendant payout means from one side of said pendant, said pendant payout means comprising a plurality of like flat tapes sufficiently wide relative to their thicknesses to payout from said tandem reels in over-laying laminated layers.

5. The device set forth in claim 1, wherein said pendant payout means comprises tape that is wide and flat relative to its thickness, said tape being spirally wound upon itself to payout from ever-diminishing spirals, whereby the co-action between said reel means and said tape provides a continuously variable transmission to maintain a substantially constant rate of rotation of said reel.

6. The device set forth in claim 1, wherein said pendant payout means comprises flat tape that is sufficiently wide relative to its thickness to permit said tape to be spirally wound upon itself to payout from said reel means from ever-diminishing spirals, whereby the moment arm of said tape measured from its outer periphery to the axis of said reel decreases as the speed of the aircraft decreases.

7. The device set forth in claim 1, wherein said pendant payout means comprises a continuously variable transmission adapted to maintain a constant tension on said pendant as said aircraft landing speed diminishes to zero.

8. The device set forth in claim 1, wherein said pendant payout means comprises a continuously variable transmission adapted to maintain a constant tension on said pendant as said aircraft landing speed diminishes to zero, said transmission including pendant payout tape that is sufficiently wide relative to its thickness to permit said tape to be spirally wound upon itself so as to pay out from said reel means from ever-diminishing spirals, whereby the acting moment arm of said tape measured from the periphery of said spirally wound tape to the axis of said reel means decreases as the speed of the aircraft decreases.

9. In aircraft arresting gear of the class described including runway arresting pendant means, the improvement in friction overrun gear comprising: pendant payout reel means; pendant payout means connected to opposite sides of said pendant and to said reel means; fluid operable brake means adapted to retard the rotation of said reel means; static pressure means adapted to maintain said brake means in engagement with said reel means; fluid pump means operable by rotation of said reel means; and fluid means responsive to the operation of said pump means to engage said brake means with said reel means in excess of said static pressure means, whereby the back tension on said pendant provided by said reel means is a function of the velocity of said reel.

10. In aircraft arresting gear of the class described including runway arresting pendant means, the improvement in friction overrun gear comprising: pendant payout reel means; pendant payout means connected to opposite ends of said pendant and to said reel means; fluid operable brake means adapted to retard rotation of said reel means; static fluid pressure means adapted to maintain said brake means in engagement with said reel means; fluid pump means operable by rotation of said reel means; and fluid means responsive to the operation of said pump means to engage said brake means with said reel means, whereby the back tension on said pendant provided by said reel is a function of the velocity of said reel.

11. In aircraft arresting gear of the class described including runway arresting pendant means, the improvement in friction overrun gear comprising; a pendant payout reel; pendant payout means connected to opposite ends of said pendant and to said reel; fluid operable brake means adapted to retard rotation of said reel; fluid pump means operable by rotation of said reel; fluid means responsive to the operation of said pump means to engage said brake means with said reel; a sensing cylinder interposed between said fluid means and said brake means, said sensing cylinder including a piston positioned to relay pressure in said fluid means; and a sheave attached to said piston in position to engage said pendant payout means, whereby the direction of movement of said piston is a function of the tension in said pendant payout means and the pressure of said fluid means acting on said piston.

12. In aircraft arresting gear of the class described including runway arresting cable means, the improvement in friction overrun gear comprising: a pendant payout reel; payout means connected to opposite ends of said pendant and to said reel; a hydraulically operable brake means adapted to retard rotation of said reel; hydrostatic means adapted to hold said brake means in engagement with said reel; hydraulic pump means operable by rotation of said reel; hydraulic means responsive to the operation of said pump means adapted to hold said brake means in engagement with said reels; a sensing cylinder interposed between said pump means and said brake means, said sensing cylinder including a piston positioned to relay pressure in said hydraulic means; and a sheave attached to said piston in a position to engage said pendant payout means, whereby the actuation of said piston is also a function of the tension in said pendant payout means.

13. In aircraft arresting gear of the class described including runway arresting pendant means, the improvement in friction overrun gear comprising: pendant payout reel; pendant payout means connected to opposite ends of said pendant and to said reel; a first fluid operable brake adapted to retard rotation of said reel; first fluid pump means operable by rotation of said reel; fluid means responsive to the operation of said first pump to engage said first brake with said reel; a second fluid operable brake adapted to retard rotation of said reel; second fluid pump means operable by rotation of said reel, said fluid means being responsive to the operation of said second pump to engage said second brake with said reel; and hydro-static fluid pressure means connected to said first and second brakes adapted to hold said brakes in engagement with said reel until said fluid means responsive to the actuation of said pump means acts to engage said first and second brakes, whereby the back tension on said pendant provided by said reel is a direct function of the velocity of said reel and said fluid pressure means.

14. In aircraft arresting gear of the class described including runway arresting pendant means, the improvement in friction overrun gear comprising: a pendant payout reel; pendant payout means connected to opposite ends of said pendant and to said reel; a first fluid operable brake adapted to retard rotation of said reel; first fluid pump means operable by rotation of said reel; fluid means responsive to the operation of said first pump to engage said first brake with said reel; a second fluid operable brake adapted to retard rotation of said reel; second fluid pump means operable by rotation of said reel, said fluid means being responsive to the operation of said second pump to engage said second brake with said reel; "feed-back" sensing means interposed between said second pump and said second brake adapted to relay output information from said second pump to said second brake, said sensing means including a cylinder-encased piston, a piston rod, and a sheave connected to said piston rod for engagement with said pendant payout means.

15. The device set forth in claim 14, including static fluid pressure means adapted to hold said brakes in engagement with said reel.

16. In aircraft arresting gear of the class described including runway arresting means, the improvement in friction overrun gear comprising: a pendant payout reel; nylon tape that is flat and is sufficiently wide relative to its thickness to permit said tape to be spirally wound upon itself, said tape being secured to each end of said pendant and to said reel; means to wind said tape on said reel to provide payout of said tape in equal and opposite directions; fluid operable brake means adapted to provide back tension on said tape as it is being paid out; fluid pump means; fluid means responsive to the operation of said pump means to engage said brake means with said reel; "feed-back" sensing means interposed between said pump means and said brake means, said sensing means including a cylinder-encased piston, a piston rod, and a sheave connected to said piston rod for engagement with said tape.

17. The device set forth in claim 16, including a positional relationship between said sheave and a fully wound reel wherein the angle of wrap of said tape on said sheave increases as said reel pays out said tape.

18. In aircraft arresting gear of the class described including runway arresting pendant means, the improvement in friction overrun gear comprising: flat tape secured to each end of said pendant means; a tape payout reel; means to secure tape ends remote from said pendant means to said reel; means to wind and to payout said tape on said reel; brake means adapted to retard rotation of said reel; static means to hold said brake means in engagement with said reel; hydraulic pump means operable by said reel; hydraulic means responsive to the operation of said pump means adapted to engage said brake means with said reel; second hydraulic means responsive to operation of said pump means adapted to hold said brake means in engagement with said reel; said second hydraulic means including a servo "feed-back" cylinder interposed between said pump means and said brake means, said cylinder including a piston positioned to relay pressure in said hydraulic means; and a sheave attached to said piston and positioned to engage one of said tapes.

19. In aircraft launching and arresting gear of the class described, the improvement comprising: a runway pendant engageable by an aircraft; reel means; flat, wide band tape means connected to opposite ends of said pendant and windable on said reel means; brake means adapted to retard rotation of said reel during arresting operations; and reel rotating drive means to wind said tape means on said reel in ever-increasing single stack concentric layers.

20. In aircraft launching and arresting gear of the class described, the improvement comprising: a runway pendant engageable by an aircraft; reel means; flat, wide band tape means connected to opposite ends of said pendant and windable on said reel means; fluid operable brake means adapted to retard rotation of said reel means; pump means operable by rotation of said reel means to energize said brake means during arresting operations, whereby back tension in said tape means provided by said reel energized pump and brake means is a function of the angular velocity of said reel means; and reel rotating drive means to wind said tape on said reel.

21. The apparatus set forth in claim 20, including programming means adapted to regulate the brake horsepower output of said brake means, whereby the back tension in said tape means is maintained at a predetermined level.

22. The apparatus set forth in claim 20 including a system of recirculating fluid connected to said brake means and actuated by said pump means; a fluid reservoir in said system; a pressure controlling throttle valve in said system; and means to automatically adjust said throttle valve responsive to rotation of said reel means, whereby the pressure applied to said brake means is regulated.

23. The apparatus set forth in claim 20, including a system of recirculating fluid connected to said brake means and actuated by said pump means; a fluid reservoir in said system; a throttle valve in said system on the intake side of said pump means; and means to automatically adjust said throttle valve responsive to rotation of said reel means whereby to regulate the brake horsepower output of said brake means.

24. The apparatus set forth in claim 20, including a system of recirculating fluid connected to said brake means and actuated by said pump means; a fluid reservoir in said system; a throttle valve in said system on the high pressure side of said pump means; and means to automatically adjust said throttle valve responsive to rotation of said reel means, whereby to regulate the brake horsepower output of said brake means.

25. The apparatus set forth in claim 20, including a system of recirculating fluid actuated by said pump means; a first fluid reservoir in said system connected across said pump means; a second reservoir in said system connected directly to said brake means; means to pressurize said second reservoir; and shuttle valve means in said system normally open between said second reservoir and said brake means, and normally closed between said pump means and said brake means; and means responsive to energization of said pump to shift said shuttle valve to shut off said second reservoir from said brake means, and to connect said pump means to said brake means.

26. The apparatus set forth in claim 20, wherein said reel means comprises a pair of tape winding spools mounted on opposite sides of a runway; and said tape means comprises a pair of tapes, each connected to one end of said pendant and to one of said spools; separate pump and brake means associated with each spool; and separate spool rotating drive means to spirally wind said tapes on said spools.

27. In aircraft launching and arresting gear of the class described, including a runway pendant adapted to be engaged by an aircraft, pendant payout means, and means to apply back tension to said pendant, the improvement in pendant payout means comprising: a reel; tape that is wide and flat relative to its thickness connected at its ends to the ends of said pendant, and at its center to said reel; and means to spirally wind said tape on said reel to build a coil of concentric layers of tape, whereby during arrestment said tape pays off from said reel in ever-diminishing spirals to provide a continuously variable transmission adapted to maintain a substantially constant rate of rotation of said reel.

28. In aircraft launching and arresting gear of the class described including a runway pendant adapted to be engaged by an aircraft, pendant payout means, and means to apply back tension to said pendant, the improvement in pendant payout means comprising: a pair of concentrically rotatable spools; a pair of tapes that are each wide and flat relative to thickness, each tape being connected at one end to an end of said pendant and at its opposite end to one of said spools; and means to spirally wind said tapes on said spools to build a pair of coils of concentric layers of tape, whereby during arrestment said tapes pay off from said spools in opposite directions and in ever-diminishing spirals to provide a continuously variable transmission adapted to maintain a substantially constant rate of rotation of said spools.

29. In aircraft launching and arresting gear of the class described including a runway pendant adapted to be engaged by an aircraft, the improvement in pendant payout means comprising: a reel positioned on each side of a runway; a pair of tapes that are each wide and flat relative to thickness, each tape being connected at one end to an end of said pendant, and at its opposite end to one of said reels; and means to spirally wind said tapes on said reels to build coils of concentric layers of tape; whereby during arrestment said tapes payoff from their respective reels on opposite sides of said runway in ever-decreasing spirals to provide continuously variable transmissions adapted to maintain substantially constant velocities of rotation of said reels.

30. In aircraft launching and arresting gear of the class described, including a runway pendant adapted to be engaged by an aircraft, pendant payout means, and means to apply back tension to said pendant, the improvement in pendant payout means comprising: a plurality of reels arranged in tandem, a like plurality of tapes each of which is wide and flat relative to its thickness, each tape being connected at one end to a corresponding reel, and at its opposite end to one end of said pendant; means to spirally wind each tape on its reel to concentrically build a coil layer upon layer; and means to simultaneously payoff said tapes in aligned overlaying laminated relationship.

31. The apparatus set forth in claim 30, wherein a plurality of tandem grouped reels are positioned on opposite sides of a runway, the tapes of each tandem grouping being connected in laminated relationship to one end of said pendant.

References Cited in the file of this patent

UNITED STATES PATENTS

| | | |
|---|---|---|
| 2,712,912 | Hattan | July 12, 1955 |
| 2,866,483 | Watts et al. | Dec. 30, 1958 |
| 2,896,396 | Kenyon | July 28, 1959 |
| 2,971,727 | Haber | Feb. 14, 1961 |
| 2,987,278 | Hoffman et al. | June 6, 1961 |

OTHER REFERENCES

Aviation Week, September 23, 1957, pages 86, 87, 89, 91, 93, 95, 97 and 99.